(12) United States Patent
Penna et al.

(10) Patent No.: US 7,619,560 B2
(45) Date of Patent: Nov. 17, 2009

(54) GPS PROCESSING ARRANGEMENT

(75) Inventors: David E. Penna, Redhill (GB); Stephen A. Tickell, Redhill (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/916,345

(22) PCT Filed: Jun. 7, 2006

(86) PCT No.: PCT/IB2006/051809

§ 371 (c)(1),
(2), (4) Date: Oct. 24, 2008

(87) PCT Pub. No.: WO2006/131886

PCT Pub. Date: Dec. 14, 2006

(65) Prior Publication Data

US 2009/0073037 A1    Mar. 19, 2009

(30) Foreign Application Priority Data

Jun. 8, 2005    (EP) .................................. 05105003

(51) Int. Cl.
*G01S 1/00* (2006.01)
(52) U.S. Cl. ............................ 342/357.12; 342/357.13
(58) Field of Classification Search ............ 342/357.12, 342/357.03
See application file for complete search history.

(56) References Cited

U.S. PATENT DOCUMENTS

| 5,420,592 A * | 5/1995 | Johnson ................. 342/357.12 |
| 6,407,699 B1 * | 6/2002 | Yang .................... 342/357.12 |
| 2005/0212699 A1 * | 9/2005 | Horslund et al. ....... 342/357.06 |
| 2007/0008218 A1 * | 1/2007 | Vantalon et al. ........ 342/357.12 |
| 2007/0019715 A1 * | 1/2007 | Bochkovskiy et al. ...... 375/150 |

FOREIGN PATENT DOCUMENTS

| WO |  | 2005047923 A2 | 5/2005 |
| WO | WO | 2006/131886 A3 * | 12/2006 |

OTHER PUBLICATIONS

International Preliminary Report on Patentability for PCT/IB2006/051809, Dec. 11, 2007.*

* cited by examiner

*Primary Examiner*—Thomas H Tarcza
*Assistant Examiner*—Fred H Mull

(57) ABSTRACT

A software GPS processing arrangement comprising a FIFO buffer for receiving a stream of the GPS signal samples, a memory, a DMA controller for transferring the GPS signal samples from the FIFO buffer to the memory, a CPU running GPS signal processing software configured to retrieve the GPS signal samples from the memory and process them to obtain a position fix, and a counter operating independently of the DMA controller and the CPU for keeping count of the number of streamed GPS signal samples.

9 Claims, 1 Drawing Sheet

US 7,619,560 B2

GPS PROCESSING ARRANGEMENT

FIELD OF INVENTION

This invention relates to software GPS and, in particular, to a software GPS processing arrangement comprising a FIFO buffer for receiving a stream of the GPS signal samples, a memory, a DMA controller for transferring the GPS signal samples from the FIFO buffer to the memory and a CPU running GPS signal processing software configured to retrieve the GPS signal samples from the memory and process them to obtain a position fix.

The invention further relates to a corresponding GPS receiver front end comprising a GPS antenna and a GPS RF front-end including an analogue to digital converter for sampling received GPS signals and a processing arrangement for outputting a stream of the GPS signal samples.

BACKGROUND TO INVENTION

FIG. 1 shows, schematically, a conventional implementation 10 of software GPS. The GPS RF front end 11 receives NAVSTAR SPS GPS signals through its antenna and pre-processes them, typically by passive bandpass filtering in order to minimise out-of-band RF interference, preamplification, down conversion to an intermediate frequency (IF) and analogue to digital conversion. The resultant GPS signal samples are streamed out of the front end together with a corresponding sample clock signal to a microprocessor 12.

The GPS signal sample data is captured and stored in a system memory 13 for subsequent processing by the CPU. This is typically done by streaming the GPS signal samples in to a synchronous serial port 14, available on many microprocessors. The synchronous serial port de-serializes the data into words, e.g. typically 16 bit words, which are passed into a first in/first out (FIFO) buffer 15. A direct memory access (DMA) controller 16 is configured to take data from the FIFO and store it in system memory, being triggered by a request signal from the FIFO when a certain number of words have accumulated. The DMA transfer can be controlled by descriptors stored in memory that specify the data source and destination addresses, and the length of data to be transferred. By chaining descriptors together in a loop it is possible for the data to be captured in a ring buffer with no CPU intervention, which is an advantage in a portable system with relatively limited resources.

Software running on the CPU 17 is able to read the status of the DMA controller to determine how much data is in the ring-buffer and available for processing. By monitoring how many times the ring-buffer has been filled, it can also keep a cumulative count of the amount of data that has been captured at any moment, and hence the point in time represented by a given sample in memory. This information is critical to successful GPS decoding.

However, a problem occurs when the microprocessor clock speed is changed. This may happen frequently in a portable system as the clock speed is matched to the current processing requirement in order to conserve power. During the speed change, activity on the internal system bus including DMA transfer may be halted for over 100 microseconds, in order for integrated Phase-locked loops (PLL) to stabilize at the new frequency. The SSP will continue to receive data during this time and store it in the FIFO, but as no data is being removed from the FIFO it will eventually overflow and data will be lost. Furthermore it will not be possible to discover how much data has been lost, therefore the cumulative count of samples will become invalid. In this case the GPS decoding software may have to restart using the same algorithm as if it had just been activated, taking several seconds to acquire a new position fix.

SUMMARY OF INVENTION

In accordance with the present invention, a software GPS processing arrangement of the aforementioned type is provided with a counter operating independently of the DMA controller and the CPU for keeping count of the number of streamed GPS signal samples.

Such an arrangement ensures that the cumulative count of samples can be recovered after an interruption in data transfer and, as it is not necessary to recover all the data because of the nature of the GPS decoding algorithm, enable a prompt position fix to be determined with that data that is available, and without having to restart the decoding process.

DESCRIPTION OF DRAWINGS

Referring to FIG. 2, an implementation of software GPS in accordance with the present invention is shown in which, compared to the conventional implementation shown in FIG. 1, has a modified architecture.

Figure 1:
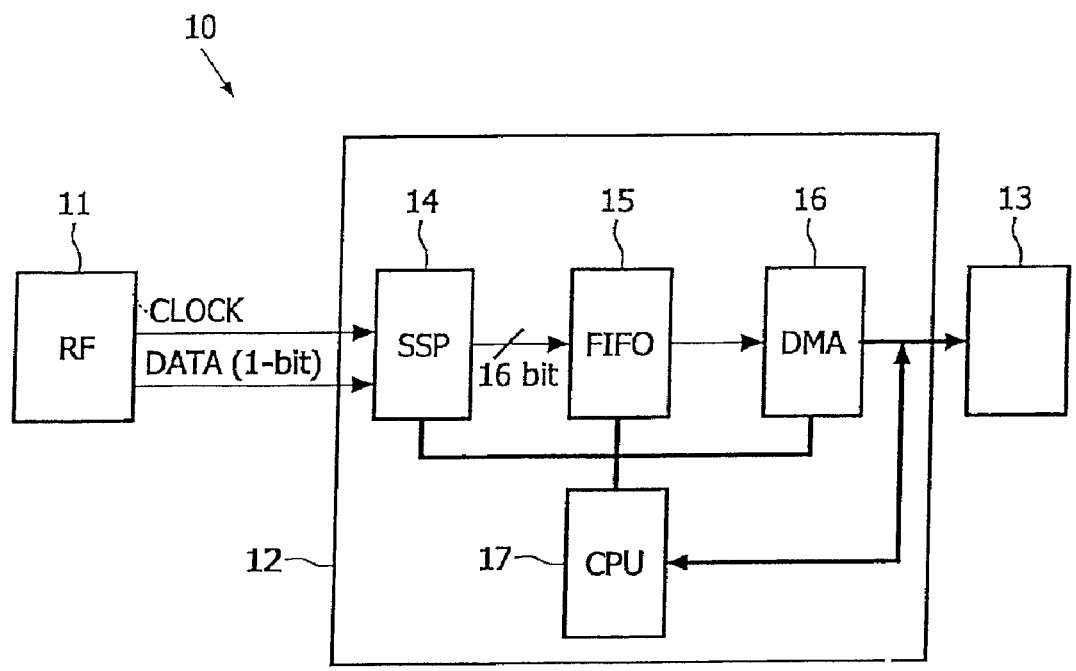
FIG. 1 shows, schematically, a conventional implementation of software GPS as described above.
Figure 2:
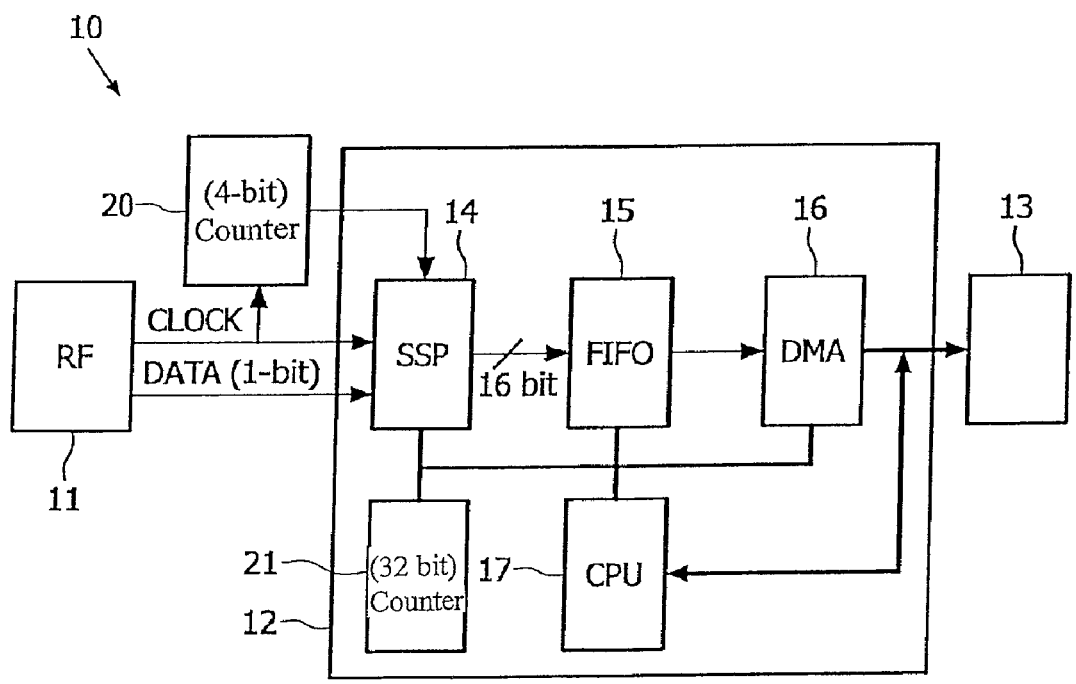
FIG. 2 shows, schematically, an implementation of software GPS in accordance with the present invention.

Specifically, a 4-bit counter (20) is connected to the GPS RF front end 11 so as to increment on each clock cycle of the GPS RF front end. The counter is a generic logic device that generates a carry-out signal every 16 clock cycles. The carry-out signal is connected to the frame input of the SSP. The frame input defines a word boundary in the data stream, and would have been generated internally by the SSP in the implementation of FIG. 1.

The frame input signal is also connected to a 32-bit counter (21) peripheral integrated with the microprocessor. Typically this can be done using software configuration of the counter clock source, but could also be achieved by connecting the frame signal to a dedicated counter input pin externally.

The counter will continue to run during interruptions to DMA transfer, and can be read by software to determine the cumulative total of data received.

Reading the counter register gives the cumulative time (in words) of the data word that has just been de-serialized by the SSP. However in order to find the capture time of data stored in memory, software must determine the address in memory where this word will be stored. The address depends on the current target address for DMA transfer, and also the number of words still in the FIFO awaiting transfer, which can be determined by reading memory-mapped registers. However these register values are also changing periodically, and a valid result can only be obtained if all three values are known at times corresponding to the same data word. This timing constraint is difficult to achieve when software is reading of all the registers consecutively, because they reside on a peripheral bus with slower access than the CPU core registers. A procedure has been devised to overcome this problem In the first stage, only the DMA target address register is monitored. This register changes during bursts of data transfer from the FIFO, which are typically much shorter than the time taken to fill the FIFO. Therefore the DMA controller will be in an idle state for longer than the FIFO and frame counter, which both change state on every word boundary. The DMA idle phase can be determined because it follows the burst transfer phase, and the address can then be regarded as stable during the following stages.

In the next stage, software repeatedly reads the register that indicates FIFO occupancy until it increments, showing that a data word has just been received.

In the final stage, software reads the count of total words received from the integrated counter register. It checks for wraparound of this counter and adjusts the total accordingly. The sample time (in words) Tn of a word in memory at offset N from the buffer start can then be calculated from $$Tn = C - F - (D - N)$$

where
- C is the value of the word counter
- F is the number of words in the FIFO
- D is the current target address of the DMA controller as an offset in words from the start of the memory buffer.

In the method described, the external 4-bit counter enables the input samples to be counted with greater reliability than if the sample clock was connected directly to the internal counter. In combination with the algorithm for reading the required registers it overcomes the problem of synchronising to an event (the sample clock) that occurs more frequently than the software is able to read the associated hardware status.

The invention claimed is:

1. A software GPS processing arrangement comprising
    a FIFO buffer for receiving a stream of the GPS signal samples;
    a memory;
    a DMA controller for transferring the GPS signal samples from the FIFO buffer to the memory;
    a CPU configured for running GPS signal processing software configured to retrieve the GPS signal samples from the memory and process them to obtain a position fix; and
    a counter configured for operating independently of the DMA controller and the CPU and for keeping count of the number of streamed GPS signal samples by incrementing a count in response to a frame signal indicating a word boundary in the stream of GPS signal samples.

2. An arrangement according to claim 1 wherein the counter is configured for receiving an external count signal in which each individual count indicates the streaming of two or more GPS signal samples.

3. The arrangement of claim 1, further including another counter that is incremented for each GPS signal sample sent to the FIFO buffer.

4. The arrangement of claim 1, further including
    a serial-to-parallel port for serially receiving the GPS signal samples, storing the received GPS signals under the control of a received clock signal and providing and outputting multiple ones of the received GPS signal samples in parallel according to word boundaries;
    another counter for incrementing a count for each clock cycle of a clock and outputting a frame signal representing a word boundary; and
    wherein the counter operating independently of the DMA controller is incremented in response to the outputted frame signal from the other counter.

5. The arrangement of claim 4 wherein the other counter generates a carry-out signal every 16 bits that is used as the frame signal, the serial-to-parallel port outputs 16 bits of GPS signal samples in parallel and the counter operating independently of the DMA controller is integrated with the CPU.

6. The arrangement of claim 4, wherein CPU is further configured for calculating the sample time by subtracting the number of GPS signal samples in the FIFO buffer, representing in words, and the DMA target address, modified by an offset from the start of a DMA memory buffer, from the count of the counter operating independently of the DMA controller.

7. The arrangement of claim 1, wherein the CPU is further configured to determine a sample time for a set of GPS signal samples transferred to the memory by
    monitoring a DMA target address to detect a DMA idle phase;
    reading, in response to detecting a DMA idle phase, a register that indicates receipt of GPS signal samples in the FIFO buffer;
    reading, in response to an indication of receipt of GPS signal samples in the FIFO buffer, the count of the counter operating independently of the DMA controller; and
    calculating the sample time as a function of the DMA target address, the count of the counter operating independently of the DMA controller and the number of GPS signal samples in the FIFO buffer.

8. The arrangement of claim 1, wherein the CPU is further configured to operate at different clock speeds and wherein during a transition between different clock speeds transfers using the DMA controller are interrupted.

9. The arrangement of claim 8, wherein the counter generating the frame signal continues to increment while the DMA controller is interrupted.

* * * * *